United States Patent
Banerjee et al.

(10) Patent No.: US 7,933,962 B1
(45) Date of Patent: Apr. 26, 2011

(54) REDUCING RELIANCE ON A CENTRAL DATA STORE WHILE MAINTAINING IDEMPOTENCY IN A MULTI-CLIENT, MULTI-SERVER ENVIRONMENT

(75) Inventors: Ashok Banerjee, Fremont, CA (US); Carmelo Kintana, Mountain View, CA (US)

(73) Assignee: Google Inc., Mountain View, CA (US)

( * ) Notice: Subject to any disclaimer, the term of this patent is extended or adjusted under 35 U.S.C. 154(b) by 71 days.

(21) Appl. No.: 12/128,835

(22) Filed: May 29, 2008

(51) Int. Cl.
*G06F 15/16* (2006.01)

(52) U.S. Cl. ........ 709/206; 709/245; 709/219; 709/221; 709/228; 709/238; 709/202; 709/226; 709/203; 719/313; 719/315; 719/316; 718/100; 718/104; 718/105

(58) Field of Classification Search ............. 709/206, 709/223–226, 245, 219, 221, 228, 238, 202, 709/203; 711/126, 148
See application file for complete search history.

(56) References Cited

U.S. PATENT DOCUMENTS

| | | | | |
|---|---|---|---|---|
| 6,889,254 B1 * | 5/2005 | Chandra et al. | ............... | 709/224 |
| 7,376,790 B2 * | 5/2008 | Lango et al. | .................. | 711/126 |
| 2008/0262797 A1 * | 10/2008 | Carusi et al. | .................. | 702/186 |

\* cited by examiner

*Primary Examiner* — Jude J Jean Gilles
(74) *Attorney, Agent, or Firm* — Park, Vaughan, Fleming & Dowler LLP

(57) ABSTRACT

One embodiment of the present invention provides a system for reducing reliance on a central data store while maintaining idempotency in a multi-client, multi-server environment. During operation, the system receives a request to perform a transaction from a client at a server, wherein the request includes a request identifier and an idempotence-risk flag. The system then determines if the idempotence-risk flag is set. If not, the system: processes the request at the server to produce a result, and stores the request in a request-cache local to the server. The system also stores the request in the central data store, and returns the result to the client.

20 Claims, 3 Drawing Sheets

REDUCING RELIANCE ON A CENTRAL DATA STORE WHILE MAINTAINING IDEMPOTENCY IN A MULTI-CLIENT, MULTI-SERVER ENVIRONMENT

BACKGROUND

1. Field of the Invention

The present invention relates to client-server applications. More specifically, the present invention relates to a method and an apparatus for reducing reliance on a central data store while maintaining idempotency in a multi-client, multi-server environment.

2. Related Art

In a typical client-server computing model, the requests of a client are uniquely identified on the server side by a request ID. This request ID enables the client to resend a request to the server if a response to the initial request has not been received from the server. When a response has not been received, it is unclear from the client's perspective if the server processed the request and failed to send the response, or the server simply could not process the request. However, sending the request a second time runs the risk that the request may be executed twice on the server.

One way to alleviate this problem is to use an idempotency feature that facilitates the resending of a request and the detection and elimination of duplicates on the server side. This duplicate-detection technique typically uses a unique identifier for each request. If the same identifier is seen again at a later time, the server may return: the previously processed result for the request, a status of the request, an error code, or some other response.

While the idempotency feature alleviates many problems, it creates significant overhead. Note that this technique becomes significantly more complex as the number of clients and servers in the system increases. Furthermore, subsequent requests may not be delivered to the same server that received the previous request. One simple way to solve this problem is for all the servers to share a central data store and to lock an entry for a given request identifier in the central data store. However, the use of such a central data store creates a bottleneck in the system which can hinder scaling of the system.

SUMMARY

One embodiment of the present invention provides a system for reducing reliance on a central data store while maintaining idempotency in a multi-client, multi-server environment. During operation, the system receives a request to perform a transaction from a client at a server, wherein the request includes a request identifier and an idempotence-risk flag. The system then determines if the idempotence-risk flag is set. If not, the system: processes the request at the server to produce a result, and stores the request in a request-cache local to the server. The system also stores the request in the central data store, and returns the result to the client.

In some embodiments of the present invention, if the idempotence-risk flag is set, the system determines if the request identifier exists in the request-cache. If so, the system returns a previous result of processing the request to the client from the request-cache. However, if not, the system determines if the request identifier exists in the central data store. If so, the system returns a previous result of processing the request to the client from the central data store. However, if the request identifier does not exist in the central data store, the system: processes the request at the server to produce a result; stores the request in the request-cache; stores the request in the central data store; and returns the result to the client.

In some embodiments of the present invention, storing the request in the central data store involves asynchronously storing the request in the central data store.

In some embodiments of the present invention, the system evicts requests from the request-cache at a pre-determined multiple of a timeout value.

In some embodiments of the present invention, the system receives a request from the client at the server to create a client identifier, wherein the request includes a suggested client identifier. Next, the system determines if the suggested client identifier exists in the central data store. If so, the system modifies the suggested client identifier to create a unique identifier and sends the unique identifier to the client as the client identifier. However, if not, the system sends the suggested client identifier to the client as the client identifier. Finally, the system stores the client identifier in the central data store.

In some embodiments of the present invention, the request identifier includes the client identifier.

In some embodiments of the present invention, the request identifier is comprised of the client identifier and a monotonically increasing value.

In some embodiments of the present invention, a set idempotence-risk flag indicates: the client has submitted the request previously; the client has written the request to a local data store; the client has explicitly set the request identifier; or the request was generated prior to a restart of the server.

DETAILED DESCRIPTION

Figure 1:
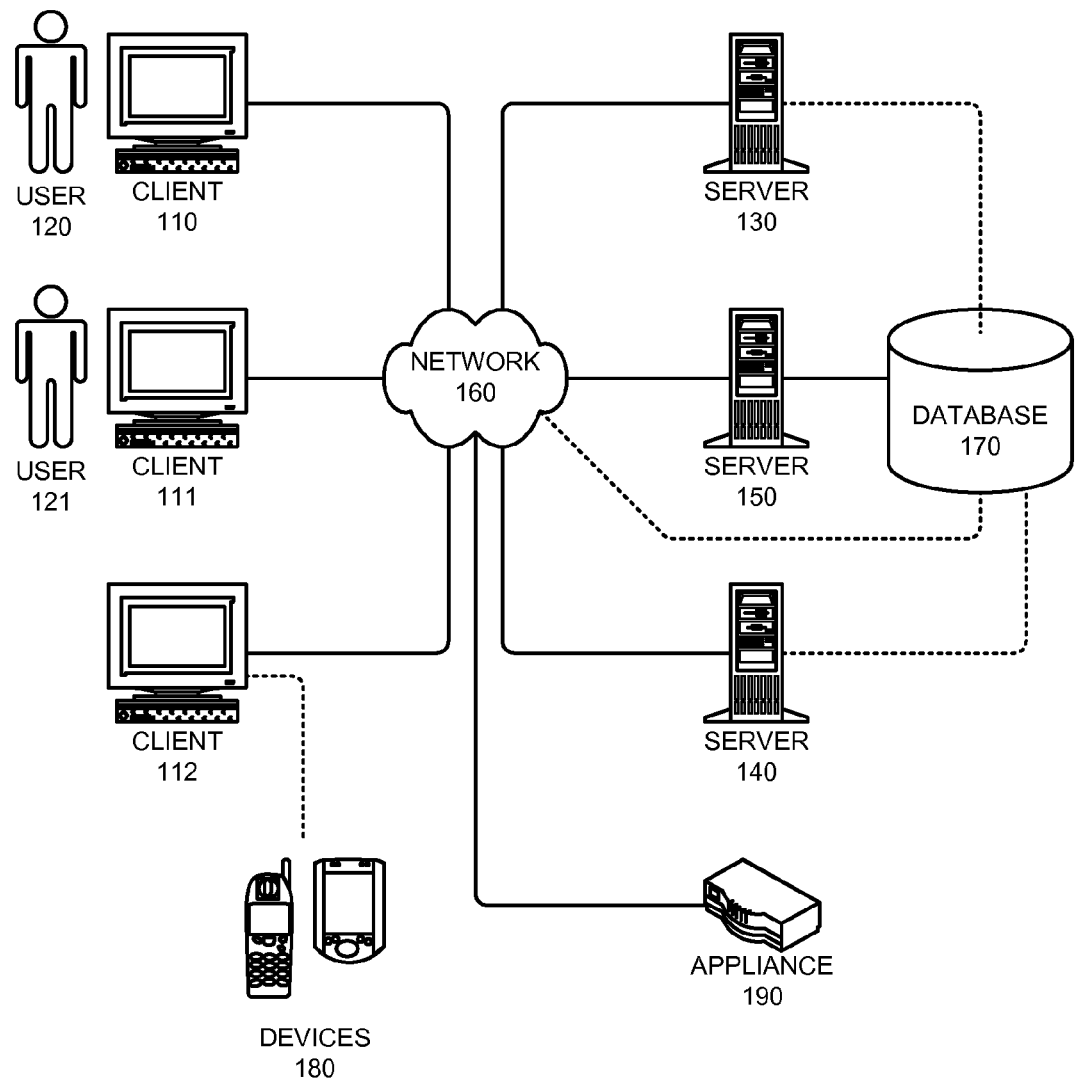
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for minimizing the reliance on a central data store while maintaining idempotency in a multi-client, multi-server environment. During operation, the system receives a request to perform a transaction from a client at a server, wherein the request includes a request identifier and an idempotence-risk flag. The system then determines if the idempotence-risk flag is set. If not, the system: processes the request at the server to produce a result, stores the request in a request-cache local to the server, stores the request in the central data store, and returns the result to the client.

Note that the request identifier (request ID) is received from the client, and is not generated by the server. Moreover, moving the generation of request IDs from the server to the client can significantly reduce resource utilization at the server. Also note that the system does not need to check with the central data store to ensure that the same request has not been previously processed. The system stores the request in the central data store, but does not need to wait for an acknowledgement that the store has been completed.

In some embodiments of the present invention, the server may append its own unique identifier to the request identifier to further ensure request-identifier uniqueness.

In some embodiments of the present invention, if the idempotence-risk flag is set, the system determines if the request identifier exists in the request-cache. If so, the system returns a previous result of processing the request to the client from the request-cache. However, if not, the system determines if the request identifier exists in the central data store. If so, the system returns a previous result of processing the request to the client from the central data store. However, if the request does not exist in the central data store, the system: processes the request at the server to produce a result; stores the request in the request-cache; stores the request in the central data store; and returns the result to the client.

A set idempotence-risk flag indicates that there is a chance that the request has already been processed, but the result was not successfully communicated back to the client. In contrast to traditional systems that check each transaction to ensure idempotence is maintained, embodiments of the present invention are only concerned with verifying idempotence for requests where the idempotence-risk flag is set. Note that during usual operating conditions, there is little chance of processing a request more than once. Because the client is aware of unusual conditions that may result in duplicate processing (for example, the client is resending a request for which the client did not receive a result), the client can set the idempotence-risk flag to alert the server of the need to perform an idempotence check. Note that the idempotence-risk flag can be implemented in a number of different ways, including setting a bit at a specific position in the request.

In most typical cases, the server will check the request-cache local to the server for the presence of the request. If the request is found in the request-cache, the server returns the information from the cache to the client. However, in the rare case that the request is not found in the request-cache (such as if the original server that processed the request failed prior to returning the result and a new server is fielding the current request), the server will check the central data store for the presence of the request. If it is not found in the central store, it is safe to assume that the initial request was not processed and the server can proceed to process the request. Otherwise, the server will return the information from the central data store to the client.

In some embodiments of the present invention, storing the request in the central data store involves asynchronously storing the request in the central data store. By eliminating the need for the server to wait for the store to complete, the server can proceed to process additional requests and is not subject to bottlenecks caused by contention for access to the central data store.

In some embodiments of the present invention, the system evicts requests from the request-cache at a pre-determined multiple of a timeout value of the server. Because most subsequent requests that carry an idempotence risk are received by the server shortly after the original request was received, the server does not need to maintain the local request-cache for extended periods of time. Embodiments of the present invention allow administrators to specify the expiration value in a variety of manners. For example, the expiration value could include an amount of time, a multiple of an existing variable (such as the server's timeout value), or a certain number of stored requests. For example, the server may maintain a local request-cache for the last 5,000 requests.

In some embodiments of the present invention, the system receives a request from the client at the server to create a client identifier, wherein the request includes a suggested client identifier. Next, the system determines if the suggested client identifier exists in the central data store. If so, the system modifies the suggested client identifier to create a unique identifier and sends the unique identifier to the client as the client identifier. However, if not, the system sends the suggested client identifier to the client as the client identifier. Finally, the system stores the client identifier in the central data store.

In some embodiments of the present invention, this client identifier creation process takes place during the bootstrap phase of the client. More specifically, the following process only takes place once each time a client is activated. The client sends its identifier to the server to verify that it is a unique client identifier. If the server discovers another client has the same identifier, the server may simply append some information to the end of the identifier to create the client identifier. For example, if two clients from the same human-resources department request the identifier "HR" from the server, the server may return the client identifier "HR-1" to the first client, and return the identifier "HR-2" to the second client.

In some embodiments of the present invention, the request identifier includes the client identifier. Note that as described previously, the client creates the request identifier, not the server. Moreover, because the client has a unique client identifier, the client can be assured that it will create a unique request identifier if it appends a local request identifier to the end of the client identifier. For example, client "HR-1" may send a first request to the server with a request identifier of "HR-1:00000001". In some embodiments of the present invention, the request identifier is comprised of the client identifier and an appended monotonically increasing value. Note that any value can be appended to the client identifier as long as it is unique per request. This value could also include a timestamp, or even an internal process identifier (provided it is unique).

In some embodiments of the present invention, a set idempotence-risk flag indicates: the client has submitted the request previously; the client has written the request to a local data store (if the client is storing the request locally, there is an elevated chance that the request will be resubmitted in the future); the client has explicitly set the request identifier (it's possible that the request identifier is not unique); or the request was generated prior to a restart of the server.

In some embodiments of the present invention, the system is embodied in instructions stored on a computer-readable storage medium. In other embodiments of the present invention, the system comprises an apparatus including a processor and memory, which for example can include computing systems and appliances.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network.

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different configurations, and are not limited to the configuration illustrated in computing environment 100.

Client Identifier Generation

Figure 2:
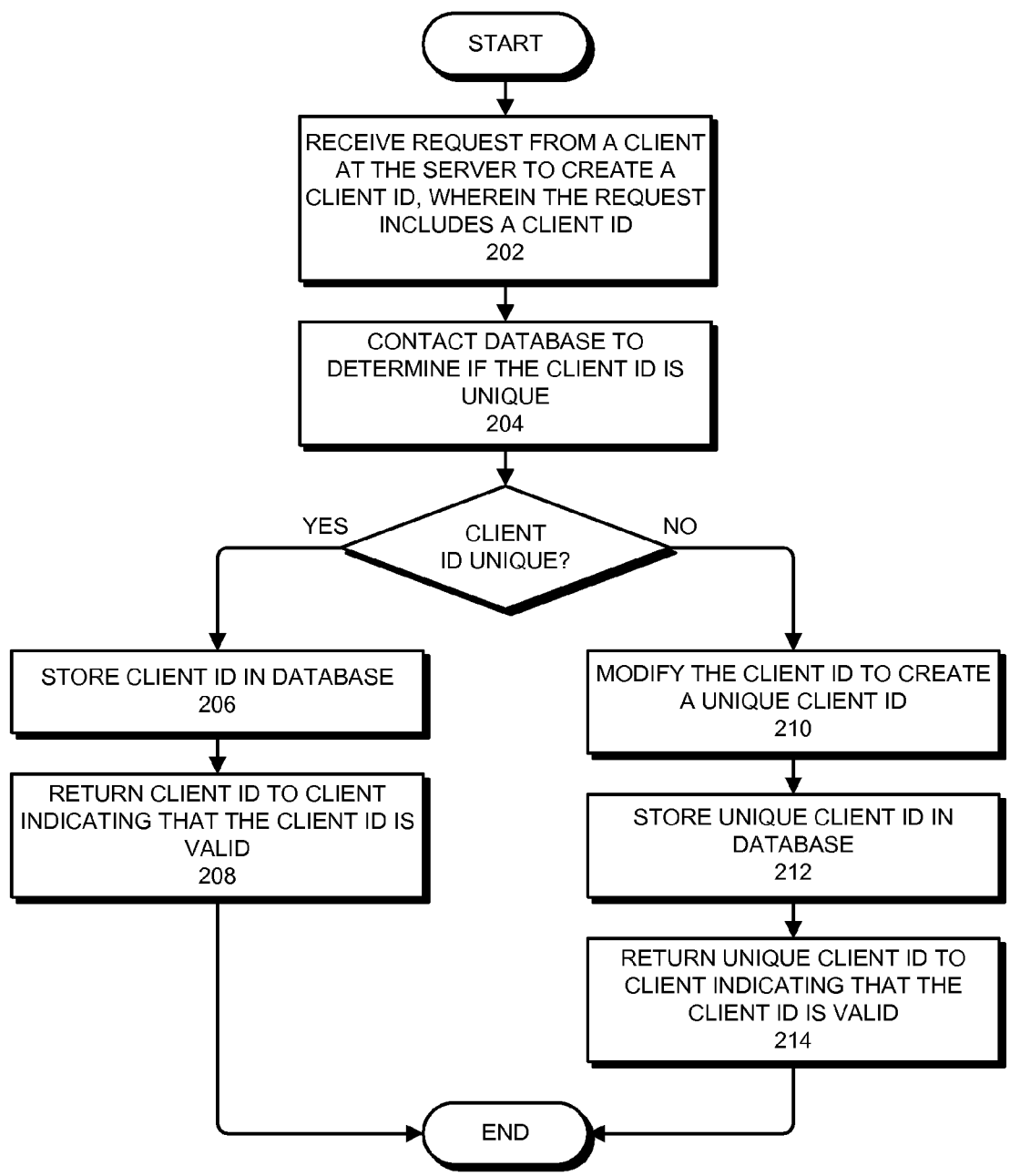
FIG. 2 presents a flow chart illustrating the process of generating client identifiers in accordance with an embodiment of the present invention.

FIG. 2 presents a flow chart illustrating the process of generating client identifiers in accordance with an embodiment of the present invention.

During operation, a server, such as server 150, receives a request from a client, such as client 110, to create a client ID (operation 202). Note that this usually takes place during the bootstrapping phase of client 110. Also note, as described previously, this request typically includes a client ID supplied by client 110. Next, server 150 contacts the central data store, such as database 170, to verify that the client identifier supplied to server 150 is unique (operation 204). If so, server 150 stores the client ID in database 170 (operation 206) and returns the client ID to client 110, indicating that it is a valid ID (operation 208).

However, if the client ID is not unique, server 150 modifies the client ID to create a unique client ID (operation 210). Note that this modification can include any technique that creates a unique ID. Finally, server 150 stores the unique client ID in database 170 (operation 212) and returns the client ID to client 110, indicating that it is a valid ID (operation 214).

Managing Requests

Figure 3:
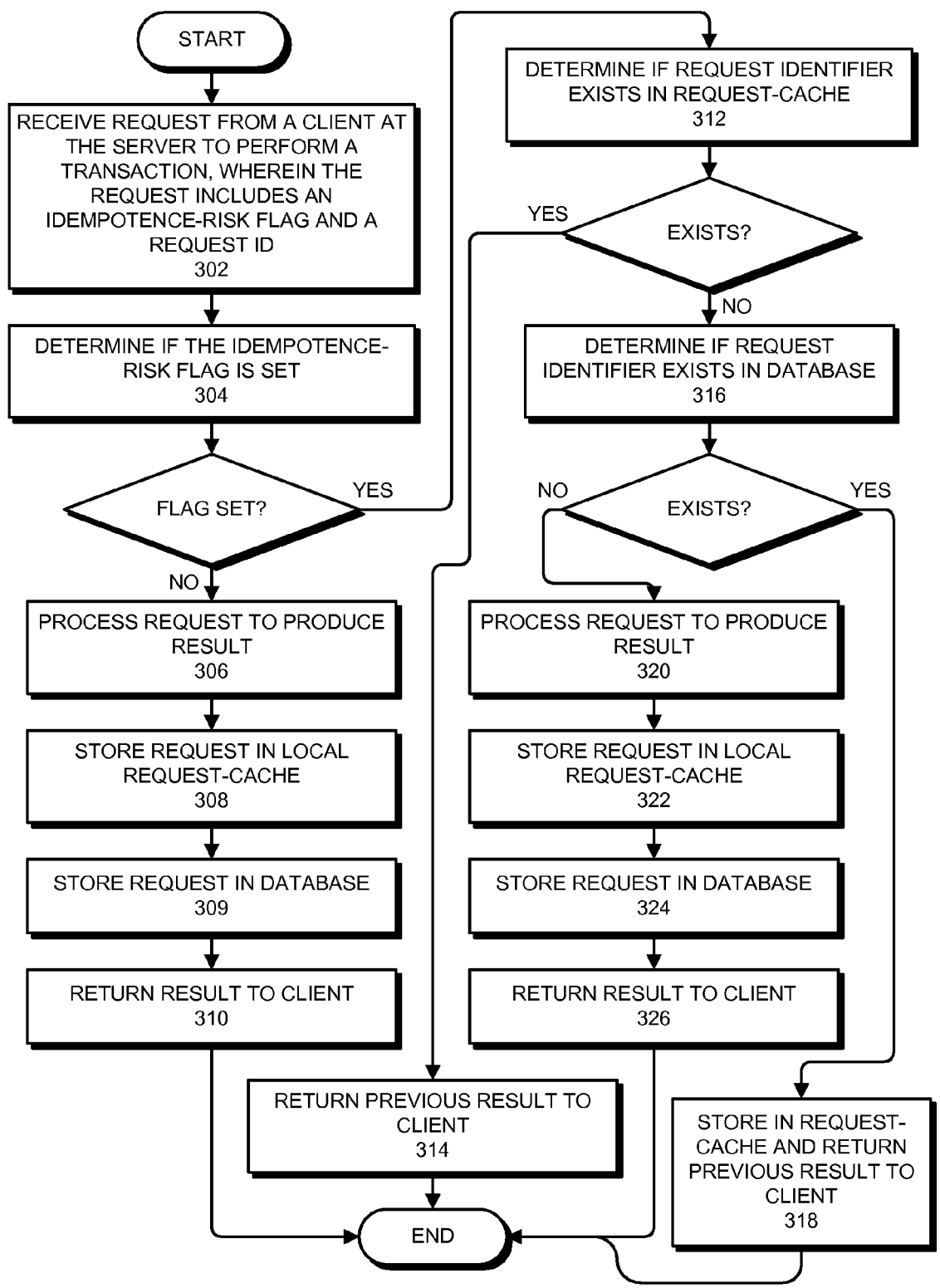
FIG. 3 presents a flow chart illustrating the process of managing requests in accordance with an embodiment of the present invention.

FIG. 3 presents a flow chart illustrating the process of managing requests in accordance with an embodiment of the present invention.

During operation, server 150 receives a request to perform a transaction from client 110, wherein the request includes a request identifier and an idempotence-risk flag (operation 302). Server 150 then determines if the idempotence-risk flag is set (operation 304). If not, server 150: processes the request to produce a result (operation 306); stores the request in a request-cache local to server 150 (operation 308); stores the request in database 170 (operation 309); and returns the result to the client 110 (operation 310).

If the idempotence-risk flag is set, server 150 determines if the request identifier exists in the request-cache (operation 312). If so, server 150 returns a previous result of processing the request to client 110 from the request-cache (operation 314). However, if not, server 150 determines if the request identifier exists in database 170 (operation 316). If so, server 150 returns a previous result of processing the request to client 110 from database 170 and stores the result in the request-cache (operation 318). However, if the request identifier does not exist in database 170, server 150: processes the request to produce a result (operation 320); stores the request in the request-cache (operation 322); stores the request in database 170 (operation 324); and returns the result to client 110 (operation 326).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing reliance on a central data store while maintaining idempotency in a multi-client, multi-server environment, the method comprising:
receiving, at a server among a plurality of servers, a request to perform a transaction from a client, wherein the request includes a request identifier and an idempotence-risk flag;
determining if the idempotence-risk flag is set, wherein a set idempotence-risk flag indicates that the request likely has been processed by the server but a corresponding result has not been received by the client; and
if not:
processing the request at the server to produce the result,
storing the request both in a request cache local to the server and a central data store shared by the plurality of servers, and
returning the result to the client.

2. The method of claim 1, wherein if the idempotence-risk flag is set, the method further comprises:
determining if the request identifier exists in the request cache,
if so, returning a previous result of processing the request to the client from the request cache, and
if not, determining if the request identifier exists in the central data store,
if so, returning a previous result of processing the request to the client from the central data store, and
if not:
processing the request at the server to produce a result,
storing the request in the request cache,
storing the request in the central data store, and
returning the result to the client.

3. The method of claim 1, wherein storing the request in the central data store involves asynchronously storing the request in the central data store.

4. The method of claim 1, further comprising evicting requests from the request cache at a pre-determined multiple of a timeout value.

5. The method of claim 1, further comprising:
receiving a request from the client at the server to create a client identifier, wherein the request includes a suggested client identifier;
determining if the suggested client identifier exists in the central data store;
if so, modifying the suggested client identifier to create a unique identifier and sending the unique identifier to the client as the client identifier;
if not, sending the suggested client identifier to the client as the client identifier; and
storing the client identifier in the central data store.

6. The method of claim 1, wherein the request identifier includes the client identifier.

7. The method of claim 6, wherein the request identifier is comprised of the client identifier and a monotonically increasing value.

8. The method of claim 1, wherein a set idempotence-risk flag indicates at least one of:
the client has submitted the request previously;
the client has written the request to a local data store;
the client has explicitly set the request identifier; and
the request was generated prior to a restart of the server.

9. A non-transitory computer-readable storage medium storing instructions that when executed by a computer cause the computer to perform a method for reducing reliance on a central data store while maintaining idempotency in a multi-client, multi-server environment, the method comprising:
receiving, at a server among a plurality of servers, a request to perform a transaction from a client, wherein the request includes a request identifier and an idempotence-risk flag;
determining if the idempotence-risk flag is set, wherein a set idempotence-risk flag indicates that the request likely has been processed by the server but a corresponding result has not been received by the client; and
if not:
processing the request at the server to produce the result,
storing the request both in a request cache local to the server and in a central data store shared by the plurality of servers, and
returning the result to the client.

10. The computer-readable storage medium of claim 9, wherein if the idempotence-risk flag is set, the method further comprises:
determining if the request identifier exists in the request cache,
if so, returning a previous result of processing the request to the client from the request cache, and
if not, determining if the request identifier exists in the central data store,
if so, returning a previous result of processing the request to the client from the central data store, and
if not:
processing the request at the server to produce a result,
storing the request in the request cache,
storing the request in the central data store, and
returning the result to the client.

11. The computer-readable storage medium of claim 9, wherein storing the request in the central data store involves asynchronously storing the request in the central data store.

12. The computer-readable storage medium of claim 9, wherein the method further comprises evicting requests from the request cache at a pre-determined multiple of a timeout value.

13. The computer-readable storage medium of claim 9, wherein the method further comprises:
receiving a request from the client at the server to create a client identifier, wherein the request includes a suggested client identifier;
determining if the suggested client identifier exists in the central data store;
if so, modifying the suggested client identifier to create a unique identifier and sending the unique identifier to the client as the client identifier;
if not, sending the suggested client identifier to the client as the client identifier; and
storing the client identifier in the central data store.

14. The computer-readable storage medium of claim 9, wherein the request identifier includes the client identifier.

15. The computer-readable storage medium of claim 14, wherein the request identifier is comprised of the client identifier and a monotonically increasing value.

16. The computer-readable storage medium of claim 9, wherein a set idempotence-risk flag indicates at least one of:
the client has submitted the request previously;
the client has written the request to a local data store;
the client has explicitly set the request identifier; and
the request was generated prior to a restart of the server.

17. An apparatus configured for reducing reliance on a central data store while maintaining idempotency in a multi-client, multi-server environment, comprising:

a receiving mechanism configured to receive, at a server among a plurality of servers, a request to perform a transaction from a client, wherein the request includes a request identifier and an idempotence-risk flag;

a determination mechanism configured to determine if the idempotence-risk flag is set, wherein a set idempotence-risk flag indicates that the request likely has been processed by the server but a corresponding result has not been received by the client;

a processing mechanism configured to process the request at the server to produce the result responsive to the idempotence-risk flag, not set;

a storage mechanism configured to store the request both in a request cache local to the server and in a central data store shared by the plurality of servers; and a delivery mechanism configured to return the result to the client.

18. The apparatus of claim 17:

wherein the determination mechanism is further configured to determine if the request identifier exists in the request cache if the idempotence-risk flag is set;

wherein the delivery mechanism is further configured to return a previous result of processing the request to the client from the request cache if the request identifier exists in the request-cache;

wherein the determination mechanism is further configured to determine if the request identifier exists in the central data store if the request identifier does not exist in the request cache; and wherein the delivery mechanism is further configured to return a previous result of processing the request to the client from the central data store if the request identifier exists in the central data store.

19. The apparatus of claim 17, wherein the storage mechanism is further configured to store the request in the central data store asynchronously.

20. The apparatus of claim 17:

wherein the receiving mechanism is further configured to receive a request from the client at the server to create a client identifier, wherein the request includes a suggested client identifier;

wherein the determination mechanism is further configured to determine if the suggested client identifier exists in the central data store;

wherein the delivery mechanism is further configured to modify the suggested client identifier to create a unique identifier and send the unique identifier to the client as the client identifier if the suggested client identifier exists in the central data store;

wherein the delivery mechanism is further configured to send the suggested client identifier to the client as the client identifier if the request identifier does not exist in the central data store; and wherein the storage mechanism is further configured to store the client identifier in the central data store.

\* \* \* \* \*